United States Patent [19]

Kryder et al.

[11] Patent Number: 4,888,750
[45] Date of Patent: Dec. 19, 1989

[54] METHOD AND SYSTEM FOR ERASE BEFORE WRITE MAGNETO-OPTIC RECORDING

[76] Inventors: Mark H. Kryder; Han-Ping D. Shieh, both of The Magnetics Technology Center, Carnegie-Mellon University, Hammerschlag Hall, D220, Pittsburgh, Pa. 15213-3890

[21] Appl. No.: 119,116

[22] Filed: Nov. 12, 1987

Related U.S. Application Data

[63] Continuation-in-part of Ser. No. 33,931, Apr. 3, 1987, abandoned, which is a continuation-in-part of Ser. No. 837,130, Mar. 7, 1986, Pat. No. 4,679,180.

[51] Int. Cl.[4] .............................................. G11B 11/12
[52] U.S. Cl. ...................................... 369/13; 365/122; 360/57; 369/100
[58] Field of Search ................... 369/13, 54, 58, 59, 369/100; 360/59, 60, 57, 114; 365/10, 11, 122, 113

[56] References Cited

U.S. PATENT DOCUMENTS

| | | | |
|---|---|---|---|
| 4,554,654 | 11/1985 | Kato | 369/58 |
| 4,570,251 | 2/1986 | Yokota et al. | 369/100 |
| 4,679,180 | 7/1987 | Kryder et al. | 369/100 |
| 4,701,881 | 10/1987 | Tanaka et al. | 365/122 |
| 4,710,431 | 12/1987 | Van Engelen et al. | 365/122 |
| 4,731,754 | 3/1988 | Ogden et al. | 365/117 |
| 4,733,385 | 3/1988 | Henmi et al. | 360/114 |

OTHER PUBLICATIONS

Evtihieve et al., IEEE Transaction on Magnetic, vol. MAG 12, No. 6, Nov/1976, pp. 773-775.

Primary Examiner—Alan Faber
Assistant Examiner—Hoa T. Nguyen

[57] ABSTRACT

Method and system for overwriting binary data values in microscopic storage regions of a thin film ferrimagnetic layer without using external magnetic bias aiding the recording process. The ferrimagnetic layer is selected having a compensation temperature at least a few tens of degrees above room temperature. In recording data, any previously recorded data is erased to establish a known state and magnetic domains of reverse magnetic polarity are recorded when the known state differs from the binary data state by temporarily heating an area on the ferrimagnetic layer above the compensation temperature in the absence of any external aiding magnetic bias.

13 Claims, 3 Drawing Sheets

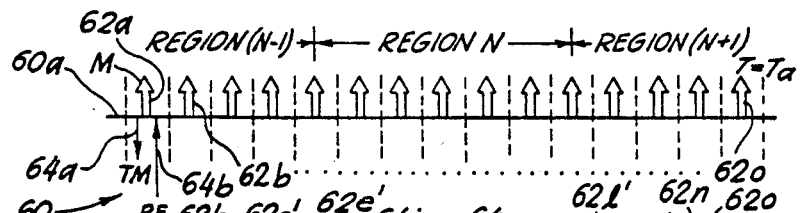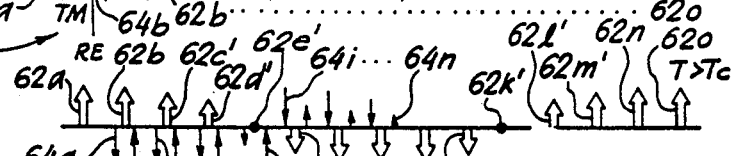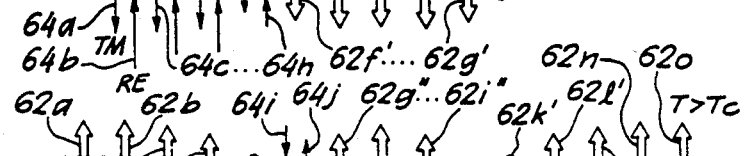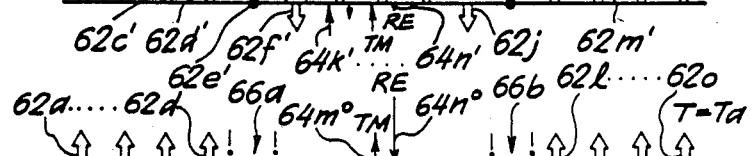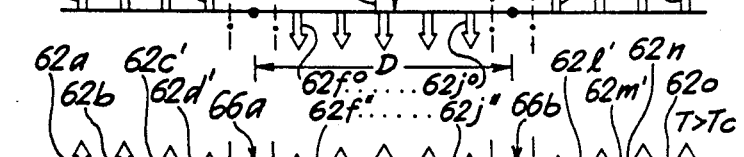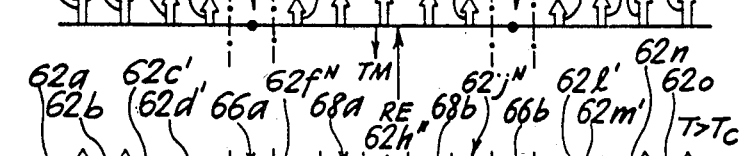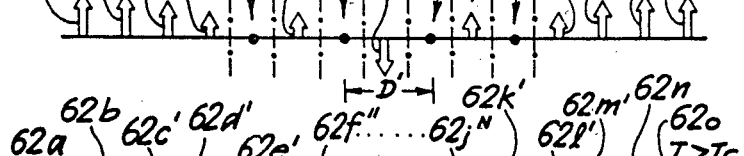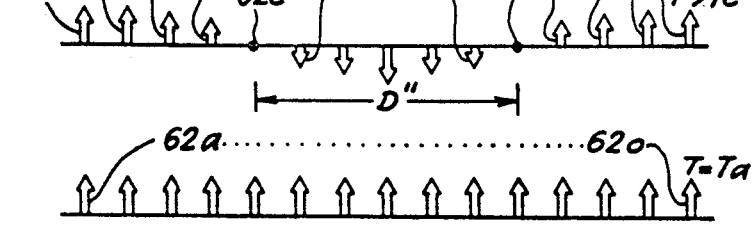

METHOD AND SYSTEM FOR ERASE BEFORE WRITE MAGNETO-OPTIC RECORDING

RELATED APPLICATIONS

This application is a continuation-in-part of application Ser. No. 033,931, filed Apr. 3, 1987, now abandoned, which in turn is a continuation of application Ser. No. 837,130, filed Mar. 7, 1986, (now U.S. Pat. No. 4,679,180).

BACKGROUND OF THE INVENTION

The present invention relates to methods and apparatus for the modification of recorded data and, more particularly, to a novel technique for the direct overwrite modification of digital data stored in domains of a magnetic-optic recording media.

The concept of storing binary bits of information from a digital data stream in a sequential multiplicity of domains formed in magnetic storage media is well known. While many different types of magnetic media have been hitherto used, including plated wires, toroidal cores, tapes and the like, the particular high-information-density media of interest here is a thin film layer of a magneto-optic recording material. Magneto-optic recording materials are amorphous ferrimagnetic alloys usually including a rare earth in combination with a transition metal such as amorphous alloys of terbium cobalt (TbCo), gadolinium terbium cobalt (GdTbCo), and the like materials.

With magneto-optic materials, the binary value of a stored bit of information can be determined by analyzing the effect upon a polarized light beam reflected from the surface. Ferrimagnetic materials chosen to have a high coercivity at room temperatures and low coercivity at higher temperatures, can be "written" by heating a small region to have a net magnetization which is not only substantially perpendicular to the surface of the film but is also established in that direction parallel to the direction in which an external (bias) magnetic field was directed at the time when that particular region was heated and allowed to subsequently cool. It is also well known that the external field direction can be changed to encode the data to be stored. Previously stored information can be changed by reheating the film region while an external bias magnetic field is presented in the desired (opposite) direction through the region. In such magneto-optic systems in which an external bias magnetic field is used to change the previously-stored information, the preferred recording material is a ferrimagnetic material with a compensation temperature (Tc) at about room temperature. However, the speed at which an external magnetic field can be made to reverse cannot presently be made as fast as is desired. Thus, although magneto-optic storage media, have demonstrated both (1) sufficient data density for the storage of gigabits of information on a disk and (2) short time for access to the previously stored data, they have not hitherto allowed randomly stored data to be modified at any speed even close to the speed at which stored data can be read from the storage disk.

For general use, data storage equipment should be capable of writing, reading and/or over-writing data at the same high rate. Accordingly, a method and apparatus by which to rapidly modify the data stored in microscopic recording regions of a magneto-optical recording medium is highly desirable.

BRIEF SUMMARY OF THE INVENTION

In accordance with one aspect of the present invention, the need for applying an external bias magnetic field to modify previously stored information in a selected region, surrounded by a magnetic domain wall, of a thin film magneto-optic medium, is eliminated by employing as the medium a magnetic material which produces a self-demagnetizing field within said region when reheated. Ferrimagnetic materials with a compensation temperature only tens of degrees C. above room temperature have been found capable of changing the magnetic state of a domain when heated with a beam of energy without using an external magnetic field. In particular, with such materials, previously recorded domains can be erased applying a laser energy in the absence of any significant external magnetic bias field. The medium preferably is a single layer and has substantially homogenous magnetic properties. The self-demagnetizing field reverses the net magnetization of the region and therefore alters the stored information.

In presently preferred embodiments, the magneto-optic recording material is an amorphous alloy of at least one rare-earth element and at least one transition-metal element, and has a compensation temperature only tens of degrees C. above room temperature; alloys of terbium cobalt (TbCo), gadolinium terbium cobalt (GdTbCo) and terbium iron cobalt (TbFeCo) are especially favored. The required heating of a microscopic region, e.g., a region with a diameter on the order of 1 micron, of the thin film of this material is carried out by a pulse of light energy from a laser diode and the like source. Pulse durations of 10–1000 nanoseconds, at power levels of 1–20 milliwatts, are satisfactory for causing self-inversion of the net magnetic moment of the heated region, and therefore, of the related stored binary logic value.

In accordance with a further aspect of the invention, a novel method for over-writing information on a magneto-optic recording material layer can be referred to as "read-before-write" and includes the steps of: reading the binary value of the bit of digital data presently stored in a selected region of the recording layer; determining if that binary value differs from the binary value of a received new bit of digital data to be stored in that region; and, only if the binary value of the new data bit is different from the presently-stored value, irradiating that region of the recording layer with a beam of energy selected to temporarily raise the temperature of substantially only that region to beyond the compensation temperature of the recording layer material, in the substantial absence of any externally-provided magnetic bias field, to cause self-inversion of the direction of net magnetization in that region.

A variation of the novel method for over-writing information on a magnetic-optic recording layer without using magnetic bias can be referred to as "erase-before-write". Instead of reading the recording medium to determine the binary value of the recorded bit in advance of the writing operation, all nucleated domains can be erased in advance of the writing operation to place the medium in a known binary state. A new bit of digital data to be stored is compared with the known state and the region on the recording layer is irradiated only if the binary value of the new data bit is different from the known state. A simple erase-before-write operation is established by the ability to repeatedly erase and selectively write nucleated domains on the recording medium. The erase operation can be achieved by detecting domains in the region to be recorded and by selectively erasing any detected domains. Alternatively, the erase operation can be achieved dynamically by a succession of closely spaced erase pulses used to erase all domains encountered in the region to be recorded.

Accordingly, an object of the present invention is to provide a novel method and apparatus for the modification of the logic value of a bit of digital dated stored in a region of magneto-optic recording medium.

Another object is to provide a recording medium, recording disk and recording system for advantageously implementing the novel method of this invention.

It is another object of the invention to provide a magneto-optic recording material on which previously recorded domains can be erased using a beam of energy without any significant bias magnetic field.

This and other objects will be more clearly appreciated from the following detailed description of our presently preferred embodiments, especially when considered in conjunction with the drawings.

BRIEF DESCRIPTION OF THE DRAWINGS

FIGS. 2a–2h are graphical representations of net magnetic moments of several adjacent data bit storage regions, at times before, during and after two successive changes in stored value.

DETAILED DESCRIPTION OF THE PRESENTLY PREFERRED EMBODIMENTS

Figure 1:
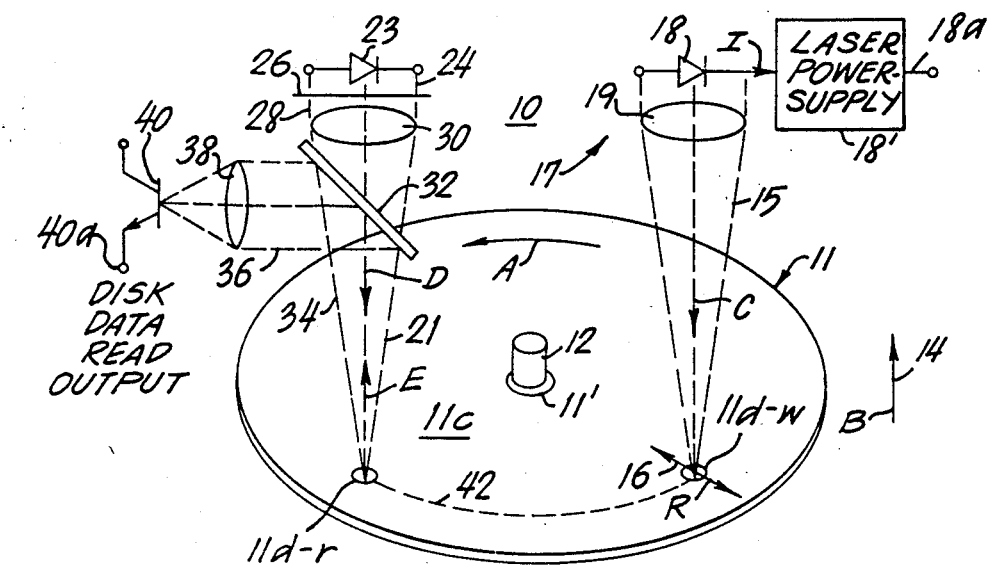
FIG. 1 is a perspective view of a magneto-optic recording disk and the apparatus to read and over-write digital data at a multiplicity of storage regions.
Figure 1A:
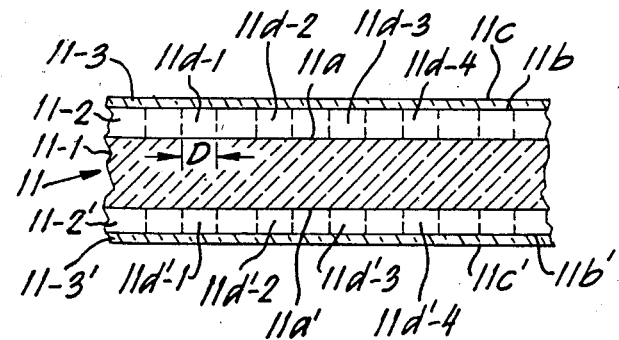
FIG. 1a is a section view through a recording disk.

Referring initially to FIGS. 1 and 1a, apparatus 10, for the magneto-optic storage of digital information, includes a storage disk 11, which may be of cylindrical shape. The disk has a central aperture 11°, through which a central spindle member 12 protrudes during operation; the disk is caused to rotate about spindle 12, in the direction of arrow A, by known mechanisms (not shown). The disk 11 is itself comprised of a discoidal substrate member 11-1, formed of a substantially non-magnetic material, such as glass and the like. The substrate has a pair of circular, substantially parallel and spaced apart surfaces 11a and 11a', upon at least one (and preferably both) of which surfaces a thin film 11-2 or 11-2' of the magneto-optic recording material is fabricated, as by sputtering and the like processes. The outwardly-directed circular surface(s) 11b (and 11b', if second layer 11-2' is present) of the recording thin film layer(s) is preferably overcoated with an optically-transparent protective layer 11-3 (or 11-3') of glass and the like. Each recording layer 11-2 or 11-2' is characterized by a multiplicity of microscopic data storage regions 11d, e.g., the consecutive storage regions 11d-1 through 11d-4 defined through the upper recording layer 11-2, and the consecutive storage regions 11d'-1 through 11d'-4 defined through the lower recording layer 11-2'. Each recording region has an average diameter D, on the order of 1 micron. Each recording layer is fabricated of a magneto-optic material, such as an alloy of gadolinium terbium cobalt (GdTbCo), terbium cobalt (TbCo), gadolinium iron cobalt (GdFeCo) and the like, which has a compensation temperature $T_c$ higher than the highest expected ambient temperature $T_a$, but much less than the crystallization temperature of the alloy. Compensation temperatures only a few tens of degrees C. above the normal room temperature are preferred.

The crystallization temperature for alloys of gadolinium terbium cobalt (GdTbCo) and terbium cobalt (TbCo) is about 250° C. and, therefore, the compensation temperature should be below 200° C. and preferably below 140° C. to avoid any crystallization of the recording medium.

A few tens of degrees C. above normal room temperature sets the minimum compensation temperature $T_c$ for this invention at 40° C. Since disk drives are commonly designed for operation up to 55° C. ambient, a compensation temperature above 60° C. is preferable.

Experimental work has established that magnetic domains in ferrimagnetic materials can be erased without magnetic bias in materials with a compensation temperature in the range of 40° C. to 140° C. Erasure, although possible, does not work reliably outside this range.

A preferred target compensation temperature for the recording medium according to the invention is 80° C. The preferred range of actual compensation temperatures about the target temperature is 60° C. to 100° C.

In general it is known that the compensation temperature of a ferrimagnetic recording medium is a function of the ratio of the two types of magnetic materials. In rare earth, transition metal, magneto-optic formulations, the compensation temperature is a function of the rare earth to transition metal ratio. If more than one rare earth is included in the formulation, the compensation temperature is approximately independent of the ratio of the rare earths. In formulations including iron, such as gadolinium terbium iron cobalt (GdTbFeCo), the compensation temperature is approximately independent of the iron/cobalt (Fe/Co) ratio. In formulations in which cobalt is the transition metal, about 77% cobalt yields a compensation temperature of 50° C., whereas about 75.8% cobalt yields a compensation temperature of 100° C.

The binary value of the data bit stored in any one region 1id is initially random, immediately following fabrication of disk 11. Each region is heated to a temperature greater than the compensation temperature $T_c$ while an external bias magnetic field 14, established in a direction (e.g., upwardly, as shown by arrow B) substantially perpendicular to the plane of the disk surface, is caused to pass through the heated region upon cooling, under the influence of the external field 14, each region has a net magnetic moment directed in the same direction, e.g., upward, as the direction of the initializing bias field 14. This initial magnetic moment direction can be assigned to either binary value, so long as that direction:value assignment is consistently utilized. It should be understood that run-length-limited codings could be used and that each domain could contain more than a single bit of data.

While large amounts of data may be substantially simultaneously written into the initialized memory regions, for the purpose of illustration, a single beam 15 of heating radiation is considered radially movable along a line 16 so as to be directed to fall at a presently-selected one of a plurality of points presently each defining a selected one of concentric circular tracks of sequentially-located regions 11d–w (although a spiral track can be used); one bit of digital data is to be initially written into each of regions 11d–w. The beam can be formed of optical radiation, as produced by a light source means 17, such as a laser diode 18 and a focusing lens means 19, and will be directed toward the disk, as shown by arrow C. The laser diode produces its optical radiation output responsive to a current I caused to flow therethrough, from an associated laser power supply 18', responsive to reception of a write-enable signal at a control input 18a; advantageously, the current is of a pulsed nature, to produce a light pulse signal having a duration from a minimum time interval on the order of 10 nanoseconds to a maximum time interval on the order of 1 microsecond, with power levels on the order of 1–20 milliwatts.

Preferred values for nucleating micrometer size domains in a gadolinium terbium cobalt (GdTbCo) film is by locally heating the film with seven milliwatts of laser power for a 300 nanosecond pulse duration without an externally applied magnetic field. A domain written with a pulse of 300 nanoseconds duration can be completely erased by a succeeding pulse of 100–200 nanoseconds duration at the same power level. With 12 milliwatts of laser power, a domain written with a 100 nanosecond pulse can be erased by a 30–80 nanosecond pulse; a domain written with a 150 nanosecond pulse can be erased with a 35–130 nanosecond pulse; and a domain written with a 200 nanosecond pulse can be erased with a 45–175 nanosecond pulse.

The beam focusing means 19 should be configured to focus the beam, at the half power diameter thereof, to an area having a diameter less than the diameter D of the region to be heated. Thus localized heating will raise the temperature, and cause a localized decrease in the coercivity, of substantially only one region (e.g., region N, see FIG. 2) into which data is to be written.

The datum contained in any written region 11d–r can be non-destructively read therefrom by causing a reading light beam of plane-polarized light 21 (of amplitude insufficient to heat to a temperature high enough that the magnetization changes in any region upon with the reading beam impinges) to be projected in the direction of arrow D, toward the disk surface 11c. A portion of the impingent light is reflected from the region surface 11b; the reflected beam polarization is rotated in a direction dependent upon the direction in which the net magnetic moment of the region extends. Therefore, if a preselected polarization is imparted to the impingent reading beam, the polarization of the reflected beam can be analyzed to determine the binary state of the datum stored in the region being read. For example, a separate laser diode 23, of lower output power than the output power of writing laser diode 18, may provide a beam 24 of light which is polarized by passage through a polarizing means 26. It should be understood that a single, variable-power laser diode can be used with known optics to provide both a lower-power polarized reading beam and a higher-power writing beam to essentially the same region 11d (which region is the union of the regions 11d–r and 11d–w as the distance along tract 42 is reduced toward zero). The polarized beam 28 is focused by lens means 30 to a diameter less than the diameter of region 11d–r, after passage through a beam-splitting means 32. The reflected beam 34, traveling in the direction of arrow E away from disk 11, is redirected by means 32. The redirected beam 36 is focused, by lens means 38 and the like, upon the active portion of a detector means 40, which provides, at a disk data read output 40a, a logic output signal having a state commensurate with the state of the net magnetic moment of the region 11d–r being read. The present invention facilitates the direct over-writing or erasing of previously written information in selected regions of the magneto-optic medium. The method employs the self demagnetizing field created within a reheated region by the specially formulated thin film magneto-optic recording medium to reverse the net magnetization of the region and thus eliminates the requirement of the prior art for an externally applied bias magnetic field. The physical processes believed to be involved in the new method will be described hereinafter in conjunction with FIGS. 2a–2h but first, one particular application (referred to as the "read before write" approach) of the self-inverting data modifying method of the present invention will be described.

In accordance with the invention, our method to over-write the binary value of each bit of a multiplicity N of sequentially storable bits of a new data sequence over the binary value presently stored in each of the associated N sequential storage regions, causes each associated region to be interrogated and the present value of the bit stored in that region to be read therefrom. The read-out data value is then compared with the new data value to be stored in that region. If the comparison indicates that the proper binary data value is already stored in the interrogated region 11d–r, action is not necessary and comparison of the next sequential bit of new data is made against the value of the next data bit already stored in the magneto-optic media layer. If the comparison indicates that the wrong binary value is presently stored in the interrogated region, an over-write enable signal is provided to request heating of the interrogated region, to a temperature above the compensation temperature $T_c$ of the magneto-optic material (and in the absence of any substantial magnetic field external to the storage media layer and deliberately applied to reverse the net magnetic moment) to cause the actual net magnetic moment M in that region to be self-inverted and then be maintained in a stable magnetic domain. Because the disk is rotating, preferably at a well-regulated speed, the region 11d–r which was read will have moved from the location at which regions are read, along an imaginary circular track 42, to another position; the actual position at which over-writing of a region (now identified as a region 11d–w to be over-written) occurs should be somewhat beyond that required for a normal read-before-write decision sequence to occur, to allow for adjustments and the like. A time delay may be introduced to cause the over-write-enable signal, resulting from the read and compare operations, to enable the over-write energy source only at a time when the proper region has arrived at the position 11d–2 at the focus of the over-write beam 15.

Figure 1B:
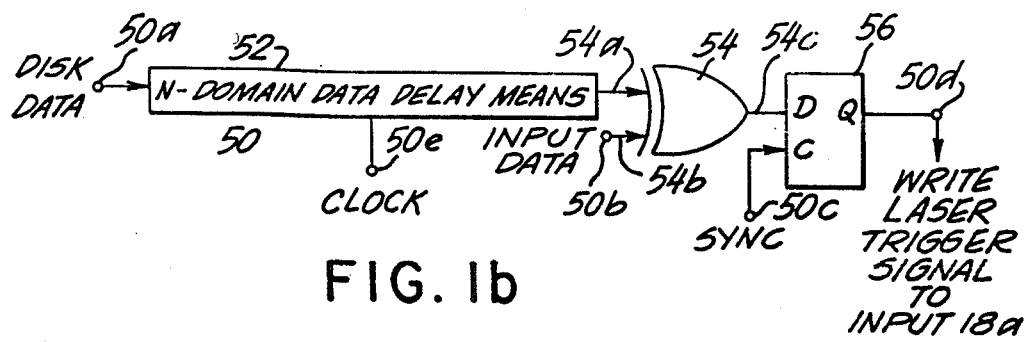
FIG. 1b is a schematic block diagram of an electronic circuit for use, with the apparatus of FIG. 1, in over-writing the digital values stored in a particular storage region.

The read-before-write (e.g., read-compare-delay-enable) operational sequence may be obtained at least in part, for example, by the functions of a subcircuit 50 such as is illustrated in FIG. 1b. The data read from the disk is, after suitable buffering and processing after output 40a, introduced at a first input 50a of the subcircuit. In one possible embodiment, the incoming data is first delayed, in a data delay means 52, for the time interval required for the region 11d-r in which the read magnetic domain resides to advance to a preselected position just prior to the position at which region 10d-w can be over-written. The delayed read data bit value is provided to a first input 54a of a comparison means 54, e.g., an exclusive-OR (XOR) gate. The incoming data bit value is provided to a second subcircuit input 50b and is coupled to other input 54b of the XOR gate. If both gate inputs are of the same binary value, then gate output 54c will be at a first level, e.g., a logic zero state, while the output 54c will be at the opposite second level, e.g., the logic one state, only if both input states are different. The gate output is connected to the data D input of a flip-flop logic element 56, which receives a clock C input signal from a sychronization SYNC. signal subcircuit input 50c. This SYNC. signal is prepared, in manner well known to the arts, from at least those sychronization signals provided by formatting of the disk storage regions. Thus, the logic level at the comparison means output 54c is clocked through to the Q output of the flip-flop only at such time as that output signal should be properly present at the subcircuit output 50d, for coupling to the enabling output 18a of the laser/power supply, for causing a pulse of laser light to be focused upon the associated storage region, which has now been moved from the location at which a region 11d-r is read to the location at which a region 11d-w is over-written. It should be understood that the comparison can be carried out first, as by connection of input 50a to gate input 54a, with placement of the delay means 52 after the comparison means and immediately prior to the synchronization means 46. It should also be understood that the delay means 52 can be positioned after the synchronization means 56. Further, it is preferable that the data delay means itself receive a clock signal, as at input 50e, recovered from the actual read data, to cause the desired N region, or domain, delay to occur without loss of accuracy. Additionally, another reading station (not shown) may be located after the overwriting station (of elements 18 and 19) to re-read the region and verify that the net magnetic moment of the domain has in fact been reversed and the value of the data bit stored in that region has been actually over-written.

Referring now to FIGS. 2a-2h, the process which we believe to be physically occurring for our self-inverting data over-write method (suing the apparent self-demagnetizing field of the thin-film magneto-optic recording media) is illustrated. Prior to the time at which a first over-write operation is to occur, the media layer 60 is at an ambient temperature Ta less than the compensation temperature Tc of the magneto-optic material. The recording regions each contain one bit of a first set of data. FIG. 2a illustrates that, for the starting data set with the same data value, e.g., a binary one state, in each of three sequential regions (N−1), N, and (N+1), the net magnetic moments (symbolized by the broad arrows 62a-62o) are all directed in the same (e.g., upward) direction substantially perpendicular to the media layer surface 60a and are all of approximately the same amplitude. The amplitude and direction of the net magnetic moment M is established by the relative amplitudes and direction of the magnetic moment of the individual components of the magneto-optic alloy. Here, the downwardly-directed moment 64a of the transition metal (TM) component of the alloy is of smaller amplitude than the upwardly-directed moment 64b of the rare earth (RE) alloy component, in each subregion.

As a region N receives energy from the overwriting means (laser 18), the temperature of that region is raised until the compensation temperature Tc is exceeded. Because the impingent light beam 15 has a substantially Gaussian energy distribution, the entire region N is not uniformly heated. Thus, while the individual alloy component magnetic moments (e.g., moments 62a and 62b) and the net magnetic moments (e.g., net moments 62a, 62b, 62n and 62o) all remain substantially unchanged in subregions removed from the region N receiving energy, those subregions nearer to the heated region N receive energy from the fringes of the beam. Responsive to the increased temperature, which is less than the compensation temperature in these other regions (N−1), (N+1), etc., the magnetic moment 64c of the transition metal TM component is decreased by some amount, which is not as great as the decrease in the magnetic moment 64d of the rare earth RE component; the net moment (e.g., net moments 65c' and 64m') of that subregion is reduced. As the temperature increases, the reduction in the magnitude of the net magnetic moment (e.g., net moments 64d' and 64l') continues, responsive to the faster reduction of the RE moment 64f than the reduction in the TM moment 64e, with closer location to region N. In some subregions the compensation temperature is just attained and the reduced amplitudes of the TM and RE moments 64g and 64h become by definition, equal; the net magnetic moment 62e', 62k', . . . are of zero magnitude (and define the periphery of the region N). Inward of the regions 62 with zero net magnetic moment, the subregion temperature exceeds the compensation temperature; the reduced amplitude of the TM moment (e.g., magnetic moments 64i, 64k, 64m . . .) is now larger than the reduced amplitude of the RE moment (e.g., magnetic moments 64j, 64l, 64m, 62f-62j'. . .) are all now reversed, having increasing magnitude but in the opposite direction (e.g., into the recording layer).

The self-demagnetizing field appears to be applied by those subregions still magnetized in the original (e.g., upward) direction; the component moment directions are now re-inverted (FIG. 2c) in those subregions still at a temperature greater than the compensation temperature. The component moments in subregions within, but adjacent to, the region N periphery remain fixed in the former direction (e.g., as shown by moments 64i and 64j) so that the net moment remains fixed in the new (now inverted) direction. The component moments in the more central subregions, however, are direction reversed to the original direction (e.g., the upward direction, as at new magnetic moments 62g", 62h", 62i", . . .). As the subregion temperature decreases upon cooling, after removal/off-switching of the light beam, the amplitudes of the alloy component magnetic moments increase to their ambient temperature values; as each subregion passes through the compensation temperature, the net magnetic moment 62 thereof is decreased to zero. As shown in FIG. 2d, in each subregion, at some temperature less than the compensation temperature, the RE magnetic moment (e.g., magnetic moment 64n') amplitude is again greater than the amplitude of the TM magnetic moment (e.g., magnetic moment 64m') and the direction of the net moment (e.g., net magnetic moment 62h') is again in the same inverted direction. The rest of the region N subregions experience the same inversion of their net magnetic moments (e.g., net magnetic moments 62g', 62i'. . .). Thus, the subregions of region N all have net magnetic moments aligned in a direction opposite to the alignment direction prior to the heating of the region N to a temperature greater than the compensation temperature. As the opposed moments nucleate a magnetic wall (as at the periphery subregions 66a and 66b upon opposite sides of region N), a stable magnetic domain is created, with diameter D, now storing the new value of the associated data bit.

Referring now to FIGS. 2e-2h, at some later time, a comparison of the data value (e.g., a logic zero) stored in the domain and the logic value (e.g., a logic one) of a new bit of binary data for storage in domain N indicates that the region N must be over-written. This decision enables the write laser diode and causes region N to be again heated, in the absence of any substantial intentional external bias magnetic field, to a temperature in excess of the compensation temperature. The domain wall, as exemplified by wall portions 66a and 66b of FIG. 2e is not abruptly destroyed; there is an inversion of the net magnetic moments 62 of the subregions within region N, due to the reversal of the alloy component magnetic moment dominance. Thus, the net magnetic moments $62f'-62j'$, of those subregions within the heated region N, are not only modified in amplitude by the Gaussian energy distribution of the impinging light beam, but are also inverted in direction, to point upwardly and away from the magneto-optic material layer. The self-demagnetizing field of the immediately-adjacent subregions (i.e., the upwardly directed net moments of the subregions $62f'$ and $62j''$) cause a reversal in the local magnetic field in the center subregion(s), as here represented by subregion $62h''$, of the heated region N, as shown in FIG. 2f, so that at least one of the interior subregions now has the net magnetic moment thereof directed in an again-inverted direction (e.g., the downwardly directed net magnetic moment $62h''$ of a smaller, region of diameter $D^1$, less than region/domain diameter D, within the larger domain/region N). A second, inner domain wall, as shown by opposed wall portions 68a and 68b, is now present about the subregion periphery. Local wall motion causes the portions of the inner wall to expand to the locations of the associated portions of the outer wall; the two walls meet and mutually annihilate one another, so that the diameter $D''$, of the region in which the net magnetic moments $62g''-62i''$ (see FIG. 2g) are still inverted, is greater than the domain diameter $D'$. As the temperature of the region N is decreased to below the compensation temperature, by cooling after cessation of the heating pulse, the relative amplitudes of the RE and TM alloy component magnetic moments change and the subregion net magnetic moments are again all directed in the same direction (e.g., the upward direction for net magnetic moments 62e-62k, of FIG. 2h). The data value stored in region N has, therefore, been inverted (e.g., to a logic one value) from the state of the data value (e.g., the logic zero value) previously stored in that region.

Figure 3:
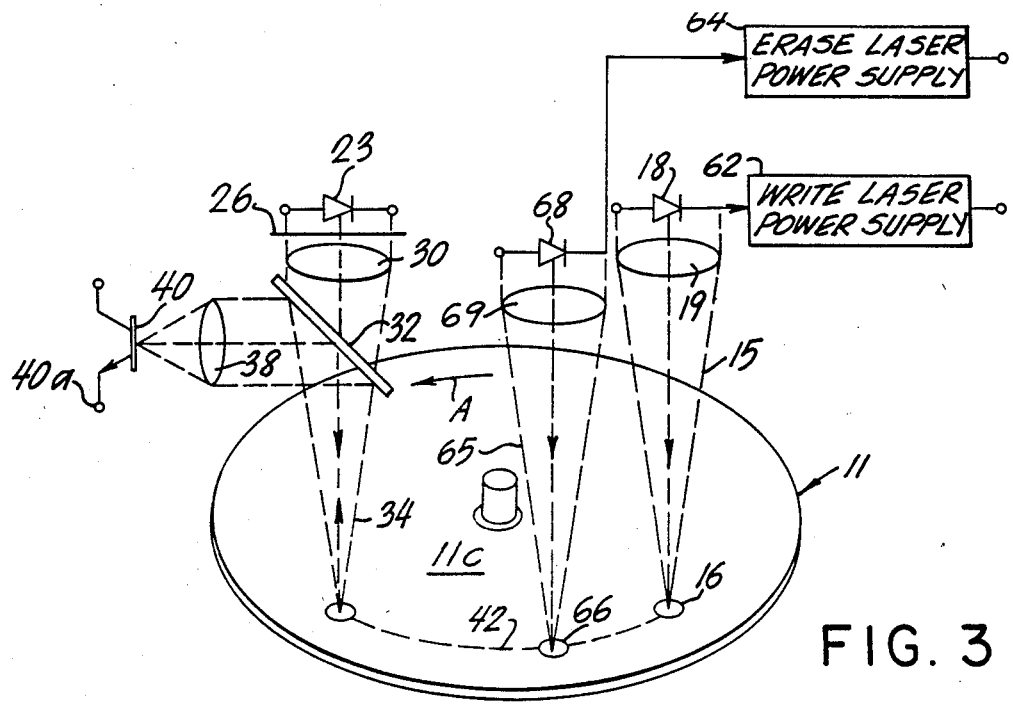
FIG. 3 is a perspective view of a magneto-optic recording disk and apparatus to read, erase and write digital data at a multiplicity of storage regions.

For the erase-before-write operation, the apparatus is modified as shown in FIG. 3 by adding a second beam of heating radiation 65 located between the write beam 15 and the read beam 34 focused on the same disk track 42. A laser diode 68 provides a beam of optical radiation which is focused by a lens 69 to direct the laser beam to the track 42 on the recording medium in a manner similar to laser diode 18 and lens 19. Laser diode 68 is connected to an erase laser power supply 64 and laser diode 18 is connected is connected to a write laser power supply 62. The laser power supplies provide current pulses to their respective laser diodes in response to applied trigger pulses. The pulse magnitude is selected in accordance with the characteristics of the medium, the thickness of the medium, and the rotating speed of the disk. For twelve milliwatts of laser power in the diodes, the write pulse provided by write laser power supply 62 could, for example, be 150 nanoseconds in duration, and the corresponding erase pulses provided by erase laser power supply 64 would have a pulse duration of approximately 90 nanoseconds.

Figure 4:
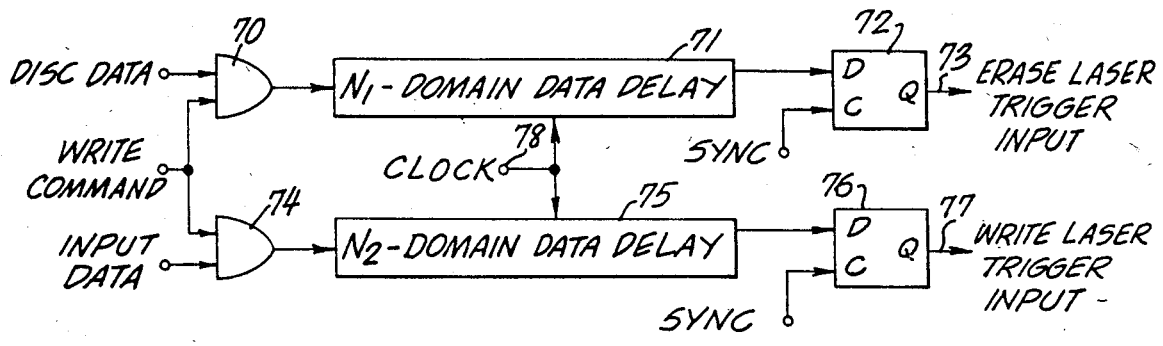
FIG. 4 is a schematic block diagram of an electronic circuit for use, with apparatus in FIG. 3, for selective erase-before-write operation.

The circuit arrangement shown in FIG. 4 can be used with the FIG. 3 apparatus to provide a selective erase-before-write system. The disk data read output from detector 40 (terminal 40a in FIG. 3) is connected to the disk data input of an AND gate 70, the other input to the AND gate being connected to receive a write command. The data to be recorded is supplied to an input data terminal of an AND gate 74, the other input of this AND gate also being connected to receive the write command.

The output of AND gate 70 passes through an $N_1$-domain data delay circuit 71 and the output of AND gate 74 passes through an $N_2$-domain data delay circuit 75. The delay in circuit 71 corresponds to the time required for a domain to travel from the road station (beam 34) to the erase station (beam 65). The delay in circuit 75 corresponds to the time required to travel from the read station to the write station (beam 15). Preferably, the delay circuits are controlled by clock pulses at terminal 78 synchronized with the incremental disk movement.

The outputs of delay circuits 71 and 75 are connected to the data D inputs of flip-flop circuits 72 and 76, respectively. The clock C inputs receive conventional sync signals. The Q output 73 of flip-flop circuit 72 is connected to the trigger input of erase laser power supply 64 and the Q output 77 of flip-flop circuit 76 is connected to the trigger input of write laser power supply 62.

In explaining the operation of the erase-before-write system a "0" corresponds to a low signal level and the initial bias state of the magneto-optic medium, whereas a "1" corresponds to a high signal level and the magnetic state of a domain recorded on the magneto-optic medium. In the presence of a write command, a domain passing the read station produces a "1" which passes through the conditioned AND gate and delay circuit 71 to produce a trigger pulse to energize laser diode 68. The laser pulse from diode 68 erases the domain as it passes under the erase station. Thus, in the presence of a write command, any domain detected at the read station is erased at the erase station, and therefore the recording medium is in a known state (the initial bias "0" state) when it reaches the write station. If the data input for AND gate 74 is at the "1" level when the write command is present, this data value passes through delay circuit 75 to develop a trigger pulse to pulse the write laser diode 18 to "write" a domain as the same region on the recording medium passes under the write station thereby recording "1" on the recording medium. On the other hand, if the data input is a "0", then the write laser diode 18 is not pulsed as the region passes the write station and the recording medium remains at the "0" value.

AND gate 74 compares the input data to the known "0" state of the medium at the write station and passes a pulse through the delay to pulse the write laser 18 only when the input data bit is different from the known state.

Figure 5:
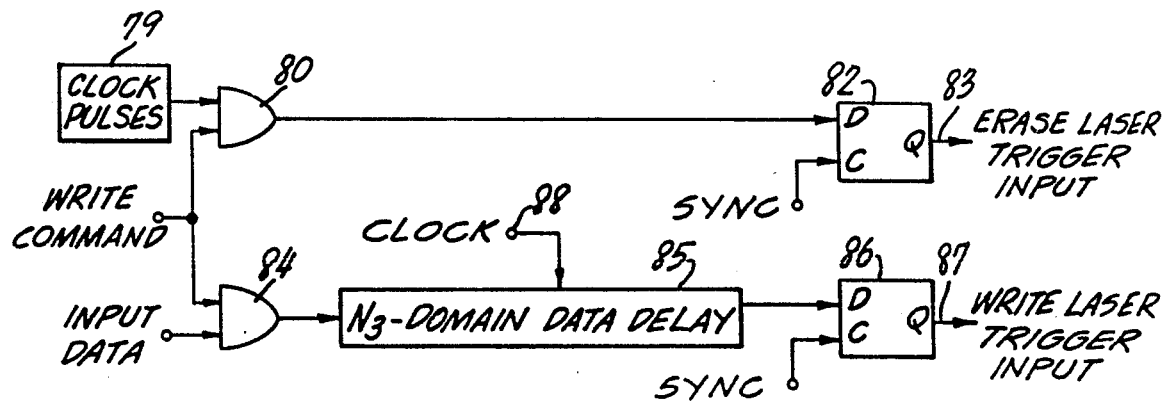
FIG. 5 is a schematic block diagram of an electronic circuit for use with apparatus in FIG. 3, for pulsed erase-before-write operation.

FIG. 5 illustrates a circuit arrangement for a pulsed erase-before-write which does not require use of the read station or exact timing of erase pulses. In the presence of a write command, the erase laser is pulsed at a rate sufficient to produce at least two laser pulses as a recorded domain passes under the erase station. A reliable complete erase of domains can be achieved if a laser erase pulse hits within the center 75% area of the domain. Thus, if the erase laser pulse rate is at least twice the rate at which domains pass under the erase station, at least one pulse will hit within the center 75% of the nominal domain diameter. In this fashion all domains along a strip prior to the write station are erased and the recording medium is thus placed in a known state (i.e. the initial bias "0" state).

In the pulsed erase-before-write arrangement a clock pulse generator 79 produces clock pulses at a rate at least twice the rate at which domains pass under the erase station. These clock pulses pass through an AND gate 80 when conditioned by a write command to provide trigger pulses to erase laser power supply 64. Laser diode 68 is pulsed and strip erases the recording disk while a write command is present.

The input data is supplied to one input of an AND gate 84, the other input of the AND gate being connected to receive the write command. The output of AND gate 84 is connected to the data D input of a flip-flop circuit 86 which in turn supplies trigger pulses to the write laser power supply 62. The $N_3$-domain data delay circuit 85 provides a time delay corresponding to the disk travel time from the erase station (beam 65) to the write station (beam 15). While the write command is present, an input data "1" produces a pulse to energize laser diode 18 to record a "1" on the recording medium whereas as input data "0" does not pulse laser diode 18 so that the recording medium remains in the "0" state.

While presently preferred embodiments of our novel method for over-writing the binary data value stored in a region of a magneto-optic thin-film recording layer have been described herein, many modifications and variations will now become apparent to those skilled in the art. It is our intent, therefore, to be limited only by the scope of the appending claims and not by the specific details and instrumentalities presented herein as illustrations.

What we claim is:

1. A method for over-writing data on a magneto-optic recording medium having a compensation temperature tens of degrees C. above room temperature, comprising the steps of:
   (a) erasing any previously recorded magnetic domain in the region on the recording medium to be recorded by temporarily heating the region being erased above the compensation temperature in the absence of any substantial externally provided magnetic bias field to thereby establish a known magnetic state in said recording medium;
   (b) receiving data bits to be recorded;
   (c) generating a write signal when a data bit and said known state are not the same; and
   (d) writing a magnetic domain in said previously erased region only in response to said write signal by temporarily heating an area above the compensation temperature in the absence of any substantial externally provided magnetic bias field.

2. The method according to claim 1 wherein said temporary heating in said erasing and said writing steps is achieved by applying laser energy to the recording medium.

3. The method according to claim 2 wherein said laser energy is applied in pulse form and wherein the pulse used for erasing is smaller than the pulse used for writing.

4. The method according to claim 1 wherein said erasing of previously recorded magnetic domains is achieved by detecting the presence of a domain and by temporarily heating an area within said domain above the compensation temperature.

5. The method according to claim 1 wherein said erasing of previously recorded magnetic domains is achieved by applying closely spaced laser pulses to the region being erased at an energy level sufficient to erase previously recorded domains, but not sufficient to create new magnetic domains.

6. A system for over-writing data on a magneto-optic recording medium comprising:
   (a) a thin film ferrimagnetic recording medium with uniaxial anistropy perpendicular to the surface thereof having a compensation temperature sufficiently above room temperature to permit erasure of previously recorded magnetic domains by temporary heating above said compensation temperature without the application of a substantial external magnetic bias field;
   (b) write means for temporarily heating selected regions of said recording medium above said compensation temperature to create magnetic domains therein using the self-demagnetizing field within said recording medium;
   (c) erase means for temporarily heating selected regions of said recording medium above said compensation temperature to erase previously created domains using the self-demagnetizing field within a domain being erased to establish a known state in said medium;
   (d) an erase controller for controlling said erase means to erase regions of said recording medium to be recorded;
   (e) data receiving means for receiving data bits to be recorded;
   (f) comparing means for comparing received data with said known state to provide a write signal where a received data bit is different than said known state; and
   (g) a write controller for controlling said write means to create a magnetic domain only in response to said write signal when said received data bit is different than said known state.

7. A system according to claim 6 wherein said recording medium has a compensation temperature in the range of 40° C. to 130° C.

8. A system according to claim 7 wherein said recording medium has a compensation temperature between 60° C. and 100° C.

9. The system according to claim 6 wherein said ferrimagnetic recording medium is an amorphous alloy including at least one rare earth and at least one transition metal.

10. The system according to claim 6 wherein said erase means and said write means include a laser source for temporarily heating said recording medium above said compensation temperature.

11. The system according to claim 6 wherein said write means irradiates said recording medium with larger pulses of energy than does said erase means.

12. The system according to claim 6 further including read means for detecting the presence of a previously recorded domain, and wherein said erase controller activates said erase means when a previously recorded domain is detected within said region to be recorded.

13. The system according to claim 6 wherein said erase controller activates said erase means to irradiate said recording medium with closely spaced pulses within said region to be recorded, and wherein said erase means irradiates said recording medium with pulses sufficient to erase previously recorded domains but not sufficient to create new domains.

* * * * *